Feb. 25, 1964 M. E. BUECHEL 3,122,674

TELEVISION RECEIVER

Filed June 29, 1960

INVENTOR.
Mel E. Buechel
BY Mueller & Aichele
Attys.

1

3,122,674

TELEVISION RECEIVER

Mel E. Buechel, Chicago, Ill., assignor to Motorola, Inc., Chicago, Ill., a corporation of Illinois Filed June 29, 1960, Ser. No. 39,654

10 Claims. (Cl. 315—22)

This invention relates to television receiver circuits and more particularly to a combination line deflection and high voltage system suitable for use in a transistorized television receiver.

The horizontal or line deflection system of a television receiver is a high energy signal generator circuit which, for example, may provide a sawtooth current at a frequency of 15.75 kc. in a magnetic deflection yoke for scanning the beam of a cathode ray tube through 114° with an anode potential in the tube of the order of 15 kv. In the past, for simplicity and economy, some of this deflection energy is applied to a voltage step-up transformer winding connected to a rectifier circuit for developing an anode voltage for the cathode ray tube which in various applications may range from 12–24 kv.

In the usual vacuum tube sawtooth deflection circuit, the vacuum tube is conductive through a transformer winding and magnetic deflection yoke during the scan or trace time and then the tube is abruptly cutoff for the retrace time, during which time energy stored in the transformer and yoke inductances is released in a ringing or resonant action of those elements, and capacitance associated therewith, after which the cycle is repeated for each deflection cycle of the cathode ray beam. The retrace ring is permitted only for one-half of its cycle because of an associated damper diode and thus a retrace pulse is generated, which is one-half of a sine wave. Because of the relatively high B+ voltage for the vacuum tube and this ringing or resonant retrace action of the transformer winding and deflection yoke, the voltage pulse generator during retrace time may be of the order of 7 kv. Accordingly, a high voltage (secondary) transformer winding inductively coupled to the transformer (primary) winding which feeds the deflection yoke can have sufficient turns to provide a voltage step-up of this pulse of two or three times for energizing a peak rectifier circuit and providing the necessary high voltage (at low current) for the cathode ray tube anode.

In the present state of the art there is increased use of transistors in electronic circuits and there is furthermore a popular interest in portable battery operated television receivers using transistors, but the prior known deflection and high voltage systems are not altogether satisfactory for receivers of this type. Considerable difficulty may be experienced in obtaining the necessary deflection signal power and sufficient high voltage for desirable operation of the cathode ray picture tube when transistors are used in commonly known deflection systems because transistors generally operate at a much lower voltage than tubes and the usual voltage step-up methods may not be effective. For example, transistors may operate at 15–20 volts direct current and the retrace voltage peak may be between 100–200 volts. Thus, the voltage step-up necessary to successfully derive high voltage for the cathode ray picture tube is of the order of 150 times (to produce 15 kv. or more), as compared to the two or three times for the voltage step-up in a comparable tube-type deflection and high voltage system. The presently used forms of transformer construction having a turns ratio to provide such a great voltage increase for transistorized circuits has not heretofore been successful and it may be shown that such great voltage step-up ratios are not obtainable with the usual transformer construction because transformer effectiveness (due to re-

2 duced primary to secondary coupling) and efficiency (due to losses) are limitations preventing successful practical operation under such conditions.

Accordingly, it is an object of this invention to provide a simple and practical transistorized circuit which produces both line sweep signals and greatly stepped-up high voltage for a television receiver.

A further object is to provide a compact, efficient high voltage and horizontal sweep system which is particularly useful in a portable battery operated television receiver and wherein the high voltage produced may be of the order of 150 times that of the pulse waves in the sweep system.

Another object is to increase efficiency, reduce the power losses and improve regulation in a high voltage and line sweep system for a television receiver operable directly from a low voltage battery.

Another object is to provide an efficient high voltage system for the anode of a cathode ray picture tube which system is powered from the horizontal scanning circuit for the cathode ray tube and which system includes an adjustable transformer to facilitate manufacture and production and wherein the high voltage system has but a minimum influence on the normal sweep functioning of the scanning circuit.

A feature of the invention is the provision of a deflection and high voltage system having a high voltage transformer winding tuned to the frequency of horizontal sawtooth deflection signals and inductively coupled to a primary winding conducting these signals through a constant impedance switch for transformer and resonant voltage gain of an induced high voltage signal. A rectifier system is connected to the winding for producing a high D.C. voltage for the anode of an associated cathode ray tube.

A further feature is the provision of a transistorized line deflection circuit having a horizontal output transformer with a primary winding coupled to a transistor and a large secondary winding with sufficient distributed capacitance to form a resonant circuit at the horizontal deflection frequency. The polarity of the secondary winding to the primary winding is such that the portion of the secondary sine type waveform which is rectified for high voltage production occurs midway in the scan cycle to maximize the high voltage potential and improve efficiency of the system.

A still further feature is the provision of a horizontal output transformer for a transistorized line deflection system and including a primary winding tunable to a retrace frequency of about 35 kc., for connection to both the transistor and the deflection yoke, a secondary winding for developing a stepped-up high voltage, and a transformer core extending between the windings with a fixed gap adjacent the primary winding and a variable gap adjacent the secondary winding to permit tuning of the secondary inductance, effective primary inductance during scan and the capacitance of the secondary winding to 15.75 kc.

Figures 1, 2, 3:
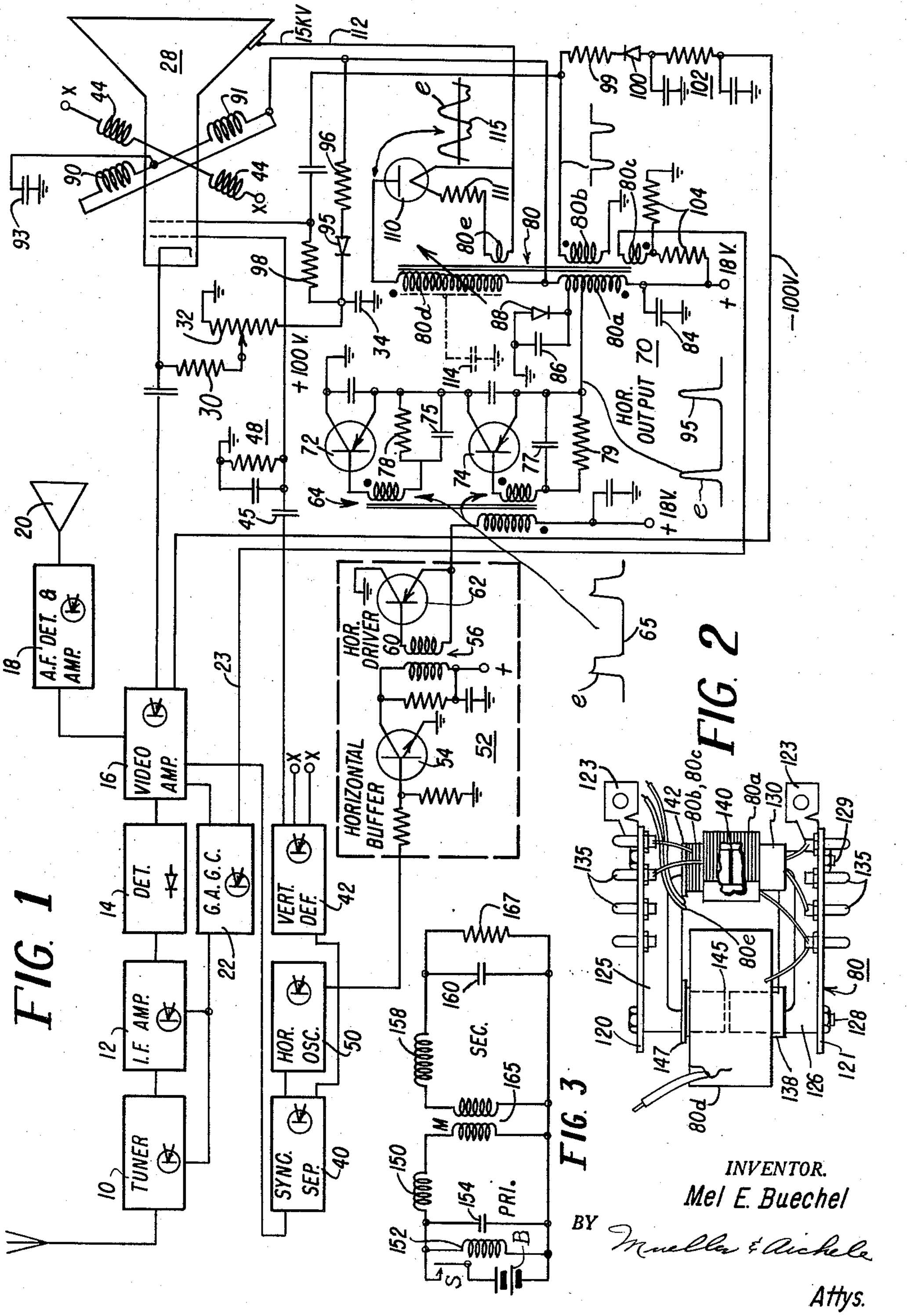
FIG. 1 is a schematic diagram of a television receiver incorporating the present invention.
FIG. 2 is an elevational view of a horizontal output transformer suitable for use in the circuit of FIG. 1.
FIG. 3 is a diagram of an equivalent circuit for a portion of the horizontal deflection and high voltage system.

A specific form of the invention provides an economical and efficient means for deriving the high voltage for the second anode of a cathode ray tube from the horizontal output transformer of a transistorized line deflection circuit of a television receiver. The primary winding of the horizontal output transformer is coupled to a transistor operated to be conductive as a constant, low impedance switch through the primary during the trace signal portion and to be an open circuit during retrace. A deflection yoke winding is coupled to the transformer to be driven by a sawtooth current waveform for horizontal deflection in the cathode ray tube. The primary and yoke windings are resonated at about 35 kc. for retrace purposes during transistor cutoff and a retrace voltage pulse of the order of 140 volts may be formed. Inductively coupled to this primary winding is a large (many turn) secondary winding which is on an adjustable core in common with the primary winding. By adjustment of the core, the secondary winding, its distributed capacity in the system and the effective primary inductance as the transistor conducts are resonated at 15.75 kc. The fundamental component of the signal of the primary winding excites the resonant circuit at this horizontal deflection frequency. A large secondary to primary turn ratio provides voltage gain. However, there is also substantial leakage reactance in the transformer which could limit output voltage. By resonating the transformer inductance, the effect of the leakage is overcome and the Q of the resonant circuit provides further voltage gain for developing a sine type voltage wave. A rectifier connected to the secondary winding is used for producing a high voltage direct current of the order of 15 kv. for the ultor or second anode of the cathode ray tube. The transformer windings are poled so the portion of the high voltage sine wave which is rectified occurs midway of beam trace, i.e. this signal portion is 180° out of phase with the fundamental component of the primary voltage wave for preferred operation.

Referring now to FIG. 1, the illustrated television receiver, which may be battery operated and all transistorized except for the picture tube and high voltage rectifier, includes a tuner 10 which selects signals from an associated antenna and converts a received signal to a fixed frequency for further selection and amplification in the IF amplifier 12. Amplifier 12 is connected to the detector 14 which demodulates a received composite video signal having line and frame synchronizing components, video frequency components, and a modulated sound carrier. The demodulated television signal is applied to the video amplifier 16 from which is derived the sound subcarrier which is applied to the sound detector and amplifier 18 for demodulation, amplification and application to the loudspeaker 20. The demodulated television signal is also applied through a direct current circuit from the detector 14 and the video amplifier 16 to the automatic gain control circuit 22. Circuit 22 is gated by means of a pulse occurring at the line deflection frequency applied thereto over lead 23 and a control potential having a value dependent upon the strength of the received signal is applied to the tuner 10 and the IF amplifier 12 for regulating the gain thereof.

Detected and amplifier video signals from the video amplifier 16 are applied to the cathode of the cathode ray picture tube 28. The cathode of this tube is also coupled through an isolating resistor 30 to the arm of the brightness control potentiometer 32. The fixed portion of the potentiometer 32 is coupled across the filter capacitor 34 across which appears a direct current voltage produced from the horizontal sweep system as will be described subsequently. Accordingly, potentiometer 32 provides an adjustable direct current bias for the cathode of tube 28.

The video amplifier 16 is further coupled to the synchronizing signal separator circuit 40 which amplitude separates both the frame and line synchronizing signal components of the composite video signal. The frame or vertical synchronizing signal, generally at 60 cycles, is then applied to the vertical deflection circuit 42 which develops a suitable sawtooth scanning current in the vertical deflection yoke winding 44 disposed on the neck of the cathode ray tube 28. Deflection circuit 42 is also coupled through a blocking capacitor 45 to the first grid of tube 28 to provide a frame blanking signal therefor. This grid is further returned to ground for direct current and bypassed at video frequencies by means of resistor-capacitor network 48.

The synchronizing signal separator circuit is also connected to the line or horizontal oscillator circuit 50 which generates a scanning control signal in synchronism with the line deflection components of the received composite video signal. A horizontal oscillator 50 applies the suitably synchronized signal at 15.75 kc. to the horizontal buffer stage 52 which includes a transistor 54. Transistor 54 is connected to the primary of a coupling transformer 56 to apply horizontal drive pulses to the horizontal driver stage 60. Stage 60 includes a transistor 62, the base and emitter of which are coupled to the transformer 56 to be driven by the horizontal drive pulses. The collector of transistor 62 is grounded and the emitter thereof is coupled through the primary winding of coupling transformer 64 to a source of positive energizing potential. The voltage waveform 65 appearing in the secondaries of transformer 64 is comprised of positive going pulses occurring at a frequency of 15.75 kc. and having a duration of approximately 18 microseconds.

The horizontal output stage 70 includes a transistor 72 series connected with a further transistor 74. One secondary winding of transformer 64 is coupled from the base of transistor 72 through coupling capacitor 75 to the emitter of transistor 72. The other secondary winding of transformer 64 is coupled from the base of transistor 74 through the coupling capacitor 77 to the emitter of transistor 74. Bias resistors 78 and 79 are connected respectively across capacitors 75 and 77 for base emitter bias of the transistors. The collector of transistor 72 is connected to ground and the emitter thereof is connected directly to the collector of transistor 74. The emitter of transistor 74 is connected to a tap point of the primary winding 80*a* of the horizontal output transformer 80. This tap point is at approximately 90% of the turns of the winding 80*a*. The end terminal of primary winding 80*a* is coupled to a positive energizing potential source which is bypassed for signal frequencies by filter capacitor 84.

A capacitor 86 is connected to a further tap point of primary winding 80*a* and to ground. This tap point is at approximately 93% of the turns of primary winding 80*a*. A damper diode 88 is coupled across the capacitor 86. The top or signal point of the primary winding 80*a* is directly connected to each of the horizontal yoke deflection coils 90, 91, the other terminals of which coils are interconnected and bypassed to ground through capacitor 93. Accordingly, the horizontal deflection yoke coils 90, 91 are effectively connected across the primary winding 80*a* since the capacitors 84 and 93 form a bypass at signal frequencies, and this is for proper impedance matching and signal coupling from the transistors 72, 74 to the yoke coils.

The operation of the horizontal output circuit 70 is such as to provide a sawtooth current waveform at 15.75 kc. in the yoke coils 90, 91 for line or horizontal deflection of the beam in the cathode ray tube 28. The transistors 72 and 74 are series conductive, in a saturated condition, through the primary winding 80*a* of the transformer 80 and during this time current is building up through this winding and the yoke coils 90 and 91. The sawtooth deflection current reaches a maximum (e.g. 8 amps. peak) as the positive going pulse in the waveform 65 is applied through the transformer 64 to the base electrodes of the transistors 73 and 74 causing abrupt cutoff thereof. At this time the energy stored in the primary winding 80*a* and the yoke coils 90, 91 is released and the circuit is permitted to oscillate at a frequency determined primarily by the combined inductance of these windings and the capacity of capacitor 86. The tuned frequency of this combination is in the order of 35 kc. resulting in the production of a voltage pulse 95 at the emitter of transistor 74. This pulse of approximately 140 volts peak comprises essentially one-half of the waveform of the oscillatory signal thus produced and has a duration of approximately 15 microseconds. Ringing or continued oscillation of the transformer and yoke circuit is stopped by damper diode 88 which begins to conduct during the second half of the ringing waveform. It is at this time that the stored energy in the primary winding 80*a* and the yoke coils 90, 91 is returned to the potential supply connected to the horizontal output circuit 70, which in the case being discussed may be a battery. Damper diode 88 remains conductive after the termination of the retrace synchronizing pulse and the commencement of deflection producing current flow in the primary winding 80*a*. At the same time reverse current flows in the transistors 72, 74 (which thus damp also). However, this occurs for only a portion of a scanning or trace portion of the cycle, and after about 16 microseconds of the 48 microsecond scanning cycle, silicon diode 88 is cutoff and only the forward conduction of transistors 72 and 74 supplies the current to primary winding 80*a* for the remaining portion of the scanning period. Accordingly, transistors 72 and 74 are cutoff during the flyback or retrace time (approximately 15 microseconds) are reverse conductive for the initial portion of scan and are driven into saturation during the latter portion of the trace signal. The damper diode 88 is rendered conductive during the latter portion of the retrace signal and the initial portion of the scanning signal. Transistor 72 is series connected to transistor 74 so that the total breakdown voltage rating of the two transistors 72 and 74 will be greater than the amplitude of the pulse on the primary winding 80*a* of the horizontal output transformer 80. Transistor 74 could be used by itself by grounding its collector if its breakdown voltage is greater than the pulse on the primary winding 80*a*.

Since a large current (e.g. 8 amperes peak) flows in the horizontal output circuit 70, some of this energy may be taken from the horizontal output transformer 80 to provide operating voltages higher than the battery voltage (here 18 volts) for energizing certain of the other circuits in the receiver. For this purpose, the rectifier diode 95 is coupled through a resistor 96 to the signal side or top of primary winding 80*a*. The cathode of the diode 95 is coupled to the filter capacitor 34 across which is connected the fixed portion on the brightness control potentiometer 32 as previously stated. Accordingly, diode 95 is used to rectify a portion of the retrace voltage pulse waveform of the primary winding 80*a* to develop cathode bias for the picture tube 28. The cathode of the rectifier diode 95 is also coupled through an isolating resistor 98 to the second grid of the picture tube to provide an energizing voltage for that element.

An additional transformer winding 80*b* is also inductively coupled to the primary winding 80*a* and one side of this winding is connected to ground and the other side is connected through a resistor 99 to the cathode of a rectifier diode 100. The anode of the rectifier diode 100 is coupled to a pi section filter nework 102. The direct current output voltage produced by this rectifier network, as energized from the retrace voltage pulses in a transformer 80, is applied to the video amplifier 16 as a voltage negative with respect to ground for the output transistor in that stage which may handle relatively high level video signals.

As previously stated, the automatic gain control circuit 22 may be of the gated type and for this purpose a further winding 80*c* is inductively coupled to the primary winding 80*a* of the transformer 80. One side of the winding 80*c* is connected to the junction of a voltage divider 104 which is coupled between the positive energizing potential and ground. The other terminal of winding 80*c* is coupled to a suitable transistorized gain control circuit in the stage 22. In this manner the circuit 22 may be rendered conductive during the retrace portion of the horizontal scanning signal which coincides with the occurrence of the line synchronizing signals of the received television signal. As understood by those in the art, a gated gain control system as suggested herein has the advantage of reducing the responsiveness of the gain control system to spurious signals which may occur between line synchronizing signals.

The horizontal output transformer 80 also includes a winding 80*d* for deriving a signal to be rectified and used as a high voltage potential for the ultor or screen of the cathode ray picture tube 28. Winding 80*d* is connected between the top side of the primary winding 80*a* and the anode of the high voltage rectifier tube 110. The filament of the tube 110 is coupled through resistor 111 across the winding 80*e*, also included as part of transformer 80. One side of the filament thereof is coupled by way of lead 112 to the ultor or second anode of the picture tube 28. The sine wave-like voltage waveform 115, which is developed at the top side of winding 80*d* (or across the distributed capacitor 114) is applied to the rectifier tube 110 and this signal is rectified to produce a direct current potential having a value of the order of 15 kv. As generally indicated previously, the high voltage secondary winding 80*d* of the horizontal output transformer 80 is constructed so that the inductance thereof, the effective primary inductance as the transistors conduct, and the distributed capacity 114 will resonate in a series mode at 15.75 kc. to ring at the frequency of the line scanning signal. Obviously once during each ring of the high voltage secondary winding the signal having considerable energy at the scanning or fundamental frequency will maximize in the primary to maintain the energization of the high voltage secondary winding. Rectifier tube 110 and the picture tube cathode to second anode current path are in series across capacitor 114 respectively as the rectifier and load for the ringing voltage thus produced across this capacitor. As indicated schematically in FIG. 1, the inductance of winding 80*d* is made variable in order that the resonant point can be accurately adjusted with all of the components connected and operating so that all circuit contributions to capacitor 114 will be taken into account.

In order to facilitate an understanding of important features of the high voltage system, attention is directed to FIG. 2 which shows a side elevational view of the horizontal output transformer 80 as it may be constructed in order to realize the advantages of the invention. The transformer includes two insulating plates 120 and 121 to which are secured the mounting lugs 123. The core of the transformer is comprised of two C-shaped members 125, 126 and these are secured to the insulating members 120 and 121 by means of the threaded fasteners 128, 129, each of which extend through members 120, 121 and through openings along both sides of the legs of the core members. The two open sides of the core members abut one another. In this manner the core is supported in the form of a rectangle with a primary side which is surrounded by the coil form 130 on which is wound the primary winding 80*a*, the rectifier filament winding 80*e* and the additional windings 80*b* and 80*c*. Connections to these various windings are made to the various terminal lugs 135 secured to the insulating members 120, 121. The opposite side of the rectangular core carries the high voltage secondary winding 80*d* which is wound on a form 138.

The ends of the core members 125 and 126 on the primary side of the core are held in fixed spacing by means of the fiber disc 140 which is compressed between the ends of the core portions by means of the threaded fastener 129. It may be noted that the coil form 130 bears against the inside of the C-shaped core portion 126 and that the opposite end of this coil form is engaged with the rubber washer 142 which bears against the core portion 125 so that the primary side of the core can be tightened firmly to retain the insulator 140 while at the same time the windings 80*a*, 80*b* and 80*c* and the form 130 are securely positioned in the transformer.

On the secondary side of the transformer 80 an airgap 145 is maintained and this gap is variable by adjustment of the threaded fastener 128. The coil form 138 bears against the inside of the core portion 126 and a resilient washer 147 is positioned between the other end of the coil form and the inside of the core portion 125. Accordingly, by adjustment of threaded fastener 128 and variation of the compression of washer 147, the permeability of the core within the secondary winding 80*d* may be varied by variation of the airgap 145 so that the winding 80*d* (with the distributed capacity thereof) may be precisely resonated at 15.75 kc. which is the horizontal deflection frequency. Tuning a few kilocycles off resonance may be desirable to reduce the rectified high voltage in some instances.

In a system of practical construction the components were as follows:

| | |
|---|---|
| Winding 80*a* | 57 turns No. 18 wire tapped at 51 and 53 turns. |
| Winding 80*d* | 6,000 turns No. 38 wire layer wound for minimum capacitance at high voltage. |
| Coefficient of coupling (80*a*, 80*d*) | About .9. |
| Effective Q of winding 80*d* | About 6. |
| Winding 80*b* | 45 turns No. 20 wire. |
| Winding 80*c* | 6 turns No. 20 wire. |
| Winding 80*e* | 2 turns No. 18 wire. |
| Cores 125, 126 | 17/32" diameter, powdered iron. |
| Washer 140 | 7 mils thick. |
| Transistors 72, 74 | 4459 (Motorola). |
| Capacitor 86 | .2 microfarad. |
| Diode 88 | 4460 (Motorola). |
| Diode tube 110 | 1S2A. |

In the construction of a transformer for a deflection and high voltage system as shown in FIG. 2, the disc 140 is used to insure that a gap will be maintained between the core portions 125, 126 and that the core will not saturate. It is, of course, desirable that the gap 145 be at a minimum when the secondary winding 80*d* is properly resonated in order to maintain high permeability of the cores 125, 126 and insure the necessary high inductance of primary winding 80*a* and secondary winding 80*d*.

In FIG. 3 there is shown an equivalent circuit for the resonant conditions associated with the horizontal output transformer 80. In the primary portion of this circuit, the inductor 150 represents the leakage inductance of the primary winding 80*a* and inductor 152 represents the inductance of the deflection yoke windings 90, 91 and capacitor 154 represents the resonating capacitor for retrace signals, primarily capacitor 86. The battery power supply is shown as battery B and switch S represents the transistors 72, 74 which are closed during trace (nearly all of the cycle) as a constant and low impedance switch. In the secondary portion of this network the inductor 158 represents the leakage inductance of the secondary winding 80*d* and capacitor 160 represents the distributed capacity 114 of the secondary winding and other components. The mutual inductance between the primary and secondary windings 80*a* and 80*d* is represented by M in step-up transformer 165. The rectifier and cathode ray tube form a resistive load 167. As previously pointed out, the primary circuit is resonant at the retrace frequency, of the order of 35 kilocycles when the transistors are cut off, and the secondary circuit is resonant at a frequency of 15.75 kilocycles when the transistors are conducting.

In the present system, the secondary leakage inductance 158 with the proper capacitance 160 and the leakage inductance 150 in parallel with the mutual inductance M are resonated at 15.75 kc. during scan when switch S is closed in order to tune out the inductive reactance and the limitation that this impedance would have in obtaining a maximum voltage. When switch S opens (the transistors 72, 74 are cutoff) the system is thrown off resonance momentarily and a slight ripple occurs in the bottom (unused) portion of waveform 115. Therefore, it may be seen that the rectifier 110 will conduct once during each scan cycle about midway during forward scan when wave 115 reaches a maximum peak. At this time the transistors are conducting (S closed) and power is being supplied to the system. It will be understood that because of the low current drain from the rectifier and the capacitance of the circuit (acting as a filter), the rectifier 110 conducts only on signal peaks.

It can be seen that the number of turns of the secondary winding should be maximized both from the standpoint of maximizing the transformer voltage step-up and maximizing the inductive reactance and increasing the necessary resonating capacitive reactance so that the output voltage will be developed across a large capacitive reactance. However, in any practical secondary winding construction, the number of secondary turns is related to the distributed capacity and it will be noted that if the secondary winding includes too many turns, the inductance and capacitance thereof will not permit resonance at the horizontal scanning frequency.

In addition to transformer voltage gain in the system due to the turn ratio, there is, of course, resonant gain due to the Q of the secondary resonant circuit, which should preferably exceed 1. The effective Q of the secondary resonant circuit is determined primarily by the resistance of the windings and the resistive load 167, which effectively damps the resonant circuit. By raising the Q however, the regulation may be poorer as the effective source impedance of the power supply circuit is then increased.

In a system constructed in accordance with the above teachings it has been found possible to develop a high voltage potential of the order of 15 kv. in a transistorized horizontal deflection system operating from a battery providing 18 volts direct current. The output voltage may be higher by using a voltage doubler rectifier or modifying the driving power on the transformer construction. The operation can be attributed to the transformer step-up as well as to the resonant gain possible in the transformer and associated circuitry. That is, the very great voltage step-up is possible because of the transformer turn ratio gain and the gain of the tuned circuit which is tuned to the fundamental frequency (15.75 kc.) of the energizing circuit at which its greatest energy occurs. However, in addition to the very great voltage step-up, it should be pointed out that the transformer core (core portions 135, 136) can be particularly efficient for operation at the horizontal deflection frequency thereby reducing core losses in the transformer and reducing heating effects thereof. This is because the transformer secondary does not utilize harmonics which in systems of other types (such as 3rd harmonic ringing systems) may ring and release wasted energy between retrace cycles and damper conduction.

It should also be pointed out that there is improved voltage regulation and efficiency of the high voltage power supply of the invention for other reasons. One of the contributing factors for this is that the waveform 115 utilized by high voltage rectifier tube 110 is essentially sinusoidal in form. This operation can be contrasted to that of the usual high voltage rectifier system where the rectifier tube is pulsed by sharp pulses at relatively widely spaced intervals which renders it difficult to maintain desirable voltage regulation. In the present system the positive going portion of waveform 115 which is rectified occurs midway in the scanning signal when the system is deriving power from the battery. This is due to the primary voltage polarity and secondary winding polarity and has been found to give improved efficiency and output since the other portion of the waveform is developed during retrace when the transformer is detuned and the transistors are cut off. Thus, operation is impaired if the transformer secondary is reversed with the flyback pulse 95 as shown. This operation is in contrast to the usual "flyback" system in which the rectifier conducts during the flyback time and not 180° out of phase with it.

I claim:

1. In a line deflection system for a cathode ray tube having transistor circuit means alternately conductive and non-conductive through deflection output winding means to develop trace and retrace signals for the cathode ray tube, a high voltage system for said cathode ray tube including in combination, transformer winding means resonated substantially at the line deflection frequency and energized by the trace signals from said deflection output winding means to develop a substantially sinusoidal waveform at the line deflection frequency, and a high voltage rectifier circuit coupled to said transformer winding means and the cathode ray tube to rectify the sinusoidal waveform in said transformer winding means and provide high voltage for the cathode ray tube.

2. In a line deflection system for a cathode ray tube having transistor circuit means alternately conductive and non-conductive through a deflection yoke to develop trace and retrace scanning signals for the cathode ray tube, a high voltage system for said cathode ray tube including in combination, a first transformer winding connected to said yoke so that the scanning signals appear therein, a second transformer winding inductively coupled to said first winding to be energized by the signals therein, said transformer windings being tuned with the distributed capacity of said second winding substantially to the line deflection frequency during conduction of said transistor circuit means to develop signal energy at the line deflection frequency and of substantially sinusoidal waveform, and a high voltage rectifier circuit coupled to said second transformer winding means and the cathode ray tube to rectify the signal energy in said transformer winding means and provide high voltage for the cathode ray tube.

3. In a line deflection system for a cathode ray tube having a transistor circuit means alternately conductive and non-conductive through deflection output winding means to develop trace and retrace signals for the cathode ray tube, a high voltage system for said cathode ray tube including in combination, transformer winding means having an inductance and a distributed capacitance of selected values, core means for inductively coupling said transformer winding means to said deflection output winding means, means for adjusting said core means with respect to said transformer winding means to resonate said transformer winding means and the effective inductance of said output winding means at the line deflection frequency during conduction of said transistor circuit means, said transformer winding means having a high turn ratio with respect to said output winding means and having a Q exceeding one to develop a stepped up voltage in the form of a tuned wave at the line deflection frequency in response to said trace signals, and a high voltage rectifier circuit coupled to said transformer winding means and the cathode ray tube to rectify the voltage wave in said transformer winding means and provide high voltage for the cathode ray tube.

4. In a line deflection system for a cathode ray tube having switching circuit means alternately conductive as a substantially constant impedance and non-conductive through deflection output winding means to develop respective trace and retrace signals for the cathode ray tube, a high voltage system for said cathode ray tube including in combination, transformer winding means having an inductance and a distributed capacitance of selected values, core means for inductively coupling said transformer winding means to said deflection output winding means, means adjusting said core means with respect to said transformer winding means to resonate said transformer winding means and the effective inductance of said output winding means at the line deflection frequency during conduction of said switching circuit means, said transformer winding means having a high turn ratio with respect to said output winding means and having a Q exceeding one to develop a stepped up voltage in the form of a tuned wave at the line deflection frequency in response to said trace signals, and a high voltage rectifier circuit coupled to said transformer winding means and the cathode ray tube to rectify the voltage wave in said transformer winding means and provide high voltage for the cathode ray tube, said transformer winding means being poled to apply the tuned wave to said rectifier circuit so that the same conducts during said trace signals.

5. A high voltage and line deflection system for a television receiver utilizing a cathode ray tube including in combination, a transistor and energizing circuit means therefor, circuit means for applying line synchronized drive signals to said transistor to control the conduction thereof for conduction during trace and non-conduction during retrace intervals, an output transformer having a primary winding coupled to said transistor and responsive to the conduction condition thereof for developing beam trace and retrace signals having a signal component at the line deflection frequency, a deflection yoke for the cathode ray tube having a winding coupled to said primary winding to be energized by the trace and retrace signals for deflecting the cathode ray beam, said transformer further having a secondary winding inductively coupled to said primary winding and a high turn ratio with respect thereto, said secondary winding further having a distributed capacity, means tuning said secondary winding during conduction of said transistor so that the inductance and distributed capacity thereof resonate at the line deflection frequency with a Q exceeding one to thereby provide transformer and resonant voltage gain of the signal component at the line deflection frequency to develop wave signal energy of such frequency, and a rectifier circuit coupled to said secondary winding for utilizing the signal energy therein to provide a high voltage for the cathode ray tube.

6. A high voltage and line deflection system for a television receiver utilizing a cathode ray tube including in combination, a pair of transistors with interconnected emitter and collector electrodes, circuit means for applying line synchronized drive signals to said transistors to control the conduction thereof for trace and retrace intervals, an output transformer having a primary winding coupled to the emitter of one transistor and responsive to the conduction condition of said transistors for developing beam trace and retrace signals having a signal component at the line deflection frequency, energizing circuit means coupled to the collector of the other transistor and to said primary winding, a deflection yoke for the cathode ray tube having a winding coupled to said primary winding to be energized by the trace and retrace signals for deflecting the cathode ray beam, said transformer further having a secondary step-up winding poled oppositely to said primary winding and inductively coupled to said primary winding on an adjustable core, said secondary winding tunable with the distributed capacity thereof to the line deflection frequency to thereby provide transformer and resonant voltage change of the signal component at the line deflection frequency, and a rectifier circuit coupled to said secondary winding for utilizing the energy therein to provide a high voltage for the cathode ray tube.

7. In a line deflection system for a cathode ray tube, a transistor, a direct current source, and first winding means all series connected, means for controlling said transistor to be alternately conductive and non-conductive through said first winding means to develop trace and retrace signals for the cathode ray tube, second winding means inductively coupled to said first winding means, means tuning said second winding means to the line deflection frequency during conduction of said transistor through said first winding means, and a high voltage rectifier circuit coupled to said second winding means and the cathode ray tube to rectify the signal energy in said second winding means during conduction of said transistor.

8. A line deflection system for a cathode ray tube, including in combination, constant impedance switch means and means for controlling said switch means to be alternately conductive and non-conductive at respective trace and retrace frequencies, a direct current energizing circuit, a first transformer winding connected in series with said switch means and said energizing circuit, a second transformer winding inductively coupled to said first winding to be energized by trace signals therein, means tuning said second transformer winding to the trace frequency during conduction of said switch means, and a high voltage rectifier circuit coupled to said second transformer winding and the cathode ray tube to rectify the signal energy in said second transformer winding during conduction of said switch means and provide high voltage for the cathode ray tube.

9. A transformer for the deflection and high voltage system of a television receiver in which a cathode ray beam is deflected by a cyclical signal having trace and retrace portions generated by respective conduction and non-conduction of a constant impedance switch through the primary winding of said transformer, including in combination, a primary winding and a secondary winding both disposed on a common core, said windings having an equivalent mutual inductance therebetween, said secondary winding having a distributed capacity and a high turn ratio with respect to said primary winding, the values of the inductance and capacity of said secondary winding and the inductance of said primary winding being chosen to form a resonant circuit at the deflection signal frequency upon conduction of the switch, the Q of such resonant circuit exceeding one to provide transformer voltage gain from said primary winding to said secondary winding and resonant voltage gain in said secondary winding and to form a substantially sinusoidal waveform in said secondary winding in response to the cyclical signal in said primary winding.

10. A transformer for the deflection and high voltage system of a television receiver in which a cathode ray beam is deflected by a cyclical signal having trace and retrace portions generated by respective conduction and non-conduction of a constant impedance switch through the primary winding of said transformer, including in combination, a primary winding and a secondary winding both disposed on a common core, said core having an airgap within said secondary winding, adjustable means for varying said airgap, said secondary winding having a distributed capacity and a high turn ratio with respect to said primary winding, the values of the inductance and capacity of said second winding and the inductance of said primary winding being chosen to form a resonant circuit substantially at the deflection signal frequency upon conduction of the switch, said adjustable means providing regulation of the resonant frequency and the Q of such resonant circuit exceeding one to provide transformer voltage gain from said primary winding to said secondary winding and resonant voltage gain in said secondary winding and to form a substantially sinusoidal waveform of the deflection frequency in said secondary winding in response to the cyclical signal in said primary winding.

References Cited in the file of this patent

UNITED STATES PATENTS

| | | |
|---|---|---|
| 2,397,150 | Lyman | Mar. 26, 1946 |
| 2,797,358 | Gargini | June 25, 1957 |
| 2,899,601 | Simmons | Aug. 11, 1959 |
| 2,868,983 | Ketchum | Jan. 13, 1959 |
| 2,933,641 | Goodrich | Apr. 19, 1960 |